United States Patent
Nakai et al.

(10) Patent No.: US 9,358,661 B2
(45) Date of Patent: *Jun. 7, 2016

(54) POLISHING PAD

(71) Applicant: TOYO TIRE & RUBBER CO., LTD., Osaka-shi (JP)

(72) Inventors: Yoshiyuki Nakai, Osaka (JP); Tsuyoshi Kimura, Osaka (JP); Atsushi Kazuno, Osaka (JP); Kazuyuki Ogawa, Osaka (JP); Tetsuo Shimomura, Osaka (JP)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,497

(22) Filed: Nov. 10, 2014

(65) Prior Publication Data

US 2015/0059253 A1   Mar. 5, 2015

Related U.S. Application Data

(63) Continuation of application No. 12/439,154, filed as application No. PCT/JP2007/065934 on Aug. 16, 2007, now Pat. No. 8,993,648.

(30) Foreign Application Priority Data

| Aug. 28, 2006 | (JP) | 2006-230805 |
| Aug. 30, 2006 | (JP) | 2006-234060 |
| Jul. 13, 2007 | (JP) | 2007-184644 |
| Jul. 13, 2007 | (JP) | 2007-184658 |

(51) Int. Cl.

| B24B 37/24 | (2012.01) |
| B24D 3/26 | (2006.01) |
| C08G 18/10 | (2006.01) |
| C08G 18/48 | (2006.01) |
| C08G 18/66 | (2006.01) |
| C08G 18/72 | (2006.01) |
| B24D 3/32 | (2006.01) |
| C08G 18/08 | (2006.01) |
| B24B 29/00 | (2006.01) |
| C08G 18/38 | (2006.01) |
| C08G 18/79 | (2006.01) |

(52) U.S. Cl.
CPC . *B24B 37/24* (2013.01); *B24D 3/26* (2013.01); *B24D 3/32* (2013.01); *C08G 18/10* (2013.01); *C08G 18/4854* (2013.01); *C08G 18/6674* (2013.01); *C08G 18/724* (2013.01); *B24B 29/00* (2013.01); *C08G 18/14* (2013.01)

(58) Field of Classification Search
CPC ... C08G 18/14; C08G 18/792; C08G 18/7831
See application file for complete search history.

(56) References Cited

U.S. PATENT DOCUMENTS

| 3,198,757 A | 8/1965 | Considine et al. |
| 4,410,668 A | 10/1983 | Piccirilli et al. |
| 5,455,113 A | 10/1995 | Girgis et al. |
| 5,587,502 A | 12/1996 | Moren et al. |
| 5,614,575 A | 3/1997 | Kotschwar |
| 5,670,599 A | 9/1997 | Bassner |
| 5,840,782 A | 11/1998 | Limerkens et al. |
| 6,439,989 B1 | 8/2002 | Reinhardt et al. |
| 6,477,926 B1 | 11/2002 | Swisher et al. |
| 6,706,383 B1 | 3/2004 | Obeng et al. |
| 6,777,455 B2 | 8/2004 | Seyanagi et al. |
| 6,837,781 B2 | 1/2005 | Hishiki |
| 6,887,911 B2 | 5/2005 | Shidaker et al. |
| 7,094,811 B2 | 8/2006 | Nodelman et al. |
| 8,779,020 B2 | 7/2014 | Kazuno et al. |
| 2002/0016139 A1 | 2/2002 | Hirokawa et al. |
| 2002/0058469 A1 | 5/2002 | Pinheiro et al. |
| 2002/0078632 A1 | 6/2002 | Hasegawa et al. |
| 2002/0183409 A1 | 12/2002 | Seyanagi et al. |
| 2003/0109209 A1 | 6/2003 | Hishiki |
| 2003/0143931 A1 | 7/2003 | Hirokawa et al. |
| 2004/0018338 A1 | 1/2004 | Materniak et al. |
| 2004/0054023 A1 | 3/2004 | Kaneda et al. |
| 2004/0102137 A1 | 5/2004 | Allison et al. |

(Continued)

FOREIGN PATENT DOCUMENTS

| CN | 1407606 | 4/2003 |
| CN | 1487965 | 4/2004 |

(Continued)

OTHER PUBLICATIONS

Doura et al., U.S. Office Action mailed Jul. 22, 2010, directed to U.S. Appl. No. 11/794,284; 7 pages.

Doura et al., U.S. Office Action mailed Jan. 6, 2011, directed to U.S. Appl. No. 11/794,284; 5 pages.

Doura et al., U.S. Office Action mailed Jul. 8, 2011, directed to U.S. Appl. No. 11/794,284; 6 pages.

Kazuno et al., U.S. Office Action mailed Dec. 6, 2010, directed to U.S. Appl. No. 11/914,547; 15 pages.

(Continued)

*Primary Examiner* — Melissa Rioja (74) *Attorney, Agent, or Firm* — Morrison & Foerster LLP (57) ABSTRACT

A polishing pad capable of maintaining a high level of dimensional stability during absorption of moisture or water includes a polishing layer including a polyurethane foam having fine cells, wherein the polyurethane foam includes a cured product of a reaction of an isocyanate-terminated prepolymer (a), a polymerized diisocyanate, and a chain extender, and the isocyanate-terminated prepolymer (a) includes an isocyanate monomer, a high molecular weight polyol (a), and a low molecular weight polyol. A method for manufacturing such a polishing pad includes mixing a first component containing an isocyanate-terminated prepolymer with a second component containing a chain extender and curing the mixture to form a polyurethane foam. The pad so made is used in the manufacture of semiconductor devices.

4 Claims, 1 Drawing Sheet

(56) References Cited

U.S. PATENT DOCUMENTS

| | | |
|---|---|---|
| 2004/0157985 A1 | 8/2004 | Masui et al. |
| 2004/0224622 A1 | 11/2004 | Sakurai et al. |
| 2004/0242719 A1 | 12/2004 | Seyanagi et al. |
| 2005/0064709 A1 | 3/2005 | Shimomura et al. |
| 2005/0171224 A1 | 8/2005 | Kulp |
| 2005/0176912 A1 | 8/2005 | Shin et al. |
| 2005/0222288 A1 | 10/2005 | Seyanagi et al. |
| 2005/0275135 A1 | 12/2005 | David et al. |
| 2006/0037699 A1 | 2/2006 | Nakamori et al. |
| 2006/0078742 A1 | 4/2006 | Kauffman et al. |
| 2006/0089095 A1 | 4/2006 | Swisher et al. |
| 2006/0122287 A1 | 6/2006 | Yamamoto et al. |
| 2006/0280929 A1 | 12/2006 | Shimomura et al. |
| 2006/0280930 A1 | 12/2006 | Shimomura et al. |
| 2007/0190905 A1 | 8/2007 | Shimomura et al. |
| 2008/0085943 A1 | 4/2008 | Doura et al. |
| 2008/0305720 A1 | 12/2008 | Hirose et al. |
| 2008/0313967 A1 | 12/2008 | Sakurai et al. |
| 2009/0047872 A1 | 2/2009 | Fukuda et al. |
| 2009/0093201 A1 | 4/2009 | Kazuno et al. |
| 2009/0104850 A1 | 4/2009 | Ogawa et al. |
| 2009/0253353 A1 | 10/2009 | Ogawa et al. |
| 2009/0298392 A1 | 12/2009 | Okamoto et al. |
| 2010/0015893 A1 | 1/2010 | Kazuno et al. |
| 2010/0048102 A1 | 2/2010 | Nakai et al. |
| 2011/0218263 A1 | 9/2011 | Kazuno et al. |

FOREIGN PATENT DOCUMENTS

| | | |
|---|---|---|
| CN | 1586002 | 2/2005 |
| CN | 1602321 | 3/2005 |
| CN | 1628138 | 6/2005 |
| CN | 1671914 | 9/2005 |
| CN | 1684799 | 10/2005 |
| CN | 101115779 | 1/2008 |
| EP | 0 656 031 | 6/1995 |
| EP | 1 647 588 | 4/2006 |
| JP | 2-91279 | 3/1990 |
| JP | 6-220151 | 8/1994 |
| JP | 8-500622 | 1/1996 |
| JP | 3013105 | 1/1996 |
| JP | 8-71378 | 3/1996 |
| JP | 11-511748 | 10/1999 |
| JP | 2000-17252 | 1/2000 |
| JP | 3516874 | 6/2000 |
| JP | 2000-248034 | 9/2000 |
| JP | 2000-343412 | 12/2000 |
| JP | 2001-47355 | 2/2001 |
| JP | 2001-89548 | 4/2001 |
| JP | 2001-105300 | 4/2001 |
| JP | 2001-513450 | 9/2001 |
| JP | 2001-277101 | 10/2001 |
| JP | 2001-518852 | 10/2001 |
| JP | 2002-59358 | 2/2002 |
| JP | 2002-134445 | 5/2002 |
| JP | 2002-144220 | 5/2002 |
| JP | 2002-239905 | 8/2002 |
| JP | 3455187 | 8/2002 |
| JP | 2002-535843 | 10/2002 |
| JP | 3359629 | 12/2002 |
| JP | 2003-11066 | 1/2003 |
| JP | 2003-62748 | 3/2003 |
| JP | 2003-89051 | 3/2003 |
| JP | 2003-128910 | 5/2003 |
| JP | 2003-145414 | 5/2003 |
| JP | 2003-171433 | 6/2003 |
| JP | 2003-218074 | 7/2003 |
| JP | 2003-224094 | 8/2003 |
| JP | 2004-1169 | 1/2004 |
| JP | 3490431 | 1/2004 |
| JP | 3571334 | 2/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 | 7/2004 |
| JP | 2004-235446 | 8/2004 |
| JP | 2004-330411 | 11/2004 |
| JP | 2005-52907 | 3/2005 |
| JP | 2005-68174 | 3/2005 |
| JP | 2005-68175 | 3/2005 |
| JP | 2005-120275 | 5/2005 |
| JP | 2005-517060 | 6/2005 |
| JP | 2005-322790 | 11/2005 |
| JP | 2005-354077 | 12/2005 |
| JP | 2006-111880 | 4/2006 |
| JP | 2006-190826 | 7/2006 |
| JP | 2006-231429 | 9/2006 |
| WO | WO-94/04599 | 3/1994 |
| WO | WO-96/38453 | 12/1996 |
| WO | WO-98/45087 | 10/1998 |
| WO | WO-99/07515 | 2/1999 |
| WO | WO-00/43159 | 7/2000 |
| WO | WO-01/96434 | 12/2001 |
| WO | WO-02/24415 | 3/2002 |
| WO | WO-02/083757 | 10/2002 |
| WO | WO-03/043071 | 5/2003 |
| WO | WO-03/066703 | 8/2003 |
| WO | WO-2004/049417 | 6/2004 |
| WO | WO-2004/055089 | 7/2004 |
| WO | WO-2006/095591 | 9/2006 |
| WO | WO-2006-123559 | 11/2006 |

OTHER PUBLICATIONS

Kazuno et al., U.S. Office Action mailed Jun. 23, 2011, directed to U.S. Appl. No. 11/914,547; 12 pages.

Kazuno et al., U.S. Office Action mailed Nov. 28, 2011, directed to U.S. Appl. No. 11/914,547; 8 pages.

Kazuno et al., U.S. Office Action mailed Nov. 10, 2011, directed to U.S. Appl. No. 13/107,347; 7 pages.

Kazuno et al., U.S. Office Action mailed Jun. 5, 2012, directed to U.S. Appl. No. 13/107,347; 8 pages.

Kazuno et al., U.S. Office Action mailed Dec. 11, 2013, directed to U.S. Appl. No. 13/607,125; 14 pages.

Ogawa et al., U.S. Office Action mailed Dec. 21, 2010, directed to U.S. Appl. No. 12/065,219; 10 pages.

Ogawa et al., U.S. Office Action mailed May 11, 2011, directed to U.S. Appl. No. 12/065,219; 11 pages.

Ogawa et al., U.S. Office Action mailed Mar. 21, 2012, directed to U.S. Appl. No. 12/065,219; 7 pages.

Fukuda et al., U.S. Office Action mailed Jun. 8, 2011, directed to U.S. Appl. No. 12/095,859; 7 pages.

Nakai et al., U.S. Office Action mailed Nov. 10, 2011, directed to U.S. Appl. No. 12/439,154; 17 pages.

Nakai et al., U.S. Office Action mailed Jun. 7, 2012, directed to U.S. Appl. No. 12/439,154; 17 pages.

Nakai et al., U.S. Office Action mailed Dec. 18, 2012, directed to U.S. Appl. No. 12/439,154; 19 pages.

Nakai et al., U.S. Office Action mailed Jul. 11, 2013, directed to U.S. Appl. No. 12/439,154; 17 pages.

Nakai et al., U.S. Office Action mailed Jan. 17, 2014, directed to U.S. Appl. No. 12/439,154; 13 pages.

Nakai et al., U.S. Office Action mailed Aug. 13, 2014, directed to U.S. Appl. No. 12/439,154; 13 pages.

Kazuno et al., U.S. Office Action mailed Feb. 28, 2012, directed to U.S. Appl. No. 12/439,135; 6 pages.

Nakai et al., U.S. Office Action mailed Nov. 25, 2011, directed to U.S. Appl. No. 12/593,206; 8 pages.

Nakai et al., U.S. Office Action mailed Jul. 5, 2012, directed to U.S. Appl. No. 12/593,206; 9 pages.

Nakai et al., U.S. Office Action mailed May 9, 2013, directed to U.S. Appl. No. 12/593,206; 5 pages.

Nakai et al., U.S. Office Action mailed Sep. 9, 2013, directed to U.S. Appl. No. 12/593,206; 5 pages.

Nakai et al., U.S. Office Action mailed Mar. 21, 2014, directed to U.S. Appl. No. 12/593,206; 8 pages.

Decision of Rejection mailed Nov. 12, 2010, directed to CN Application No. 200780027350.5; 26 pages.

(56) References Cited

OTHER PUBLICATIONS

Notification of Reexamination issued Apr. 19, 2012, directed to CN Application No. 200780027350.5; 15 pages.
Notification of the Second Office Action issued Feb. 5, 2013, directed to CN Application No. 200780027350.5; 12 pages.
Office Action mailed Aug. 4, 2010, directed to CN Application No. 200880008905.6; 7 pages.
Notification of the Third Office Action issued Feb. 29, 2012, directed to CN Application No. 200880008905.6; 12 pages.
Notification of the Second Office Action issued on Jun. 17, 2011, directed to CN Application No. 200880008905.6; 10 pages.
The First Office Action issued Apr. 22, 2010, directed to CN Application No. 200910135487.3; 17 pages.
The Second Office Action issued Apr. 13, 2011, directed to CN Application No. 200910135487.3; 16 pages.
Rejection Decision issued Jul. 29, 2011, directed to CN Application No. 200910135487.3; 14 pages.
Notification of Reexamination issued May 31, 2013, directed to CN Application No. 200910135487.3; 11 pages.
First Office Action issued Jan. 8, 2010, directed to CN Application No. 200680004397.5; 25 pages.
The Second Office Action issued May 5, 2011, directed to CN Application No. 200680004397.5; 21 pages.
The Third Office Action issued Aug. 29, 2011, directed to CN Application No. 200680004397.5; 16 pages.
The Second Office Action issued Jul. 10, 2009, directed to CN Application No. 200680017384.1; 6 pages.
First Office Action issued Nov. 21, 2008, directed to CN Application No. 200680017384.1; 9 pages.
The First Office Action issued Mar. 23, 2010, directed to CN Application No. 200910135488.8; 13 pages.
The Second Office Action issued Nov. 23, 2010, directed to CN Application No. 200910135488.8; 14 pages.
Office Action issued Apr. 1, 2010, directed to CN Application No. 200780027348.8; 9 pages.
Office Action issued Mar. 11, 2010, directed to CN Application No. 200780027350.5; 17 pages.
Office Action issued May 8, 2009, directed to CN Application No. 2006800321010; 5 pages.
Notification of First Office Action issued Feb. 28, 2012, directed to CN Application No. 201110049840.3; 11 pages.
Notification of the Second Office Action issued Sep. 25, 2012, directed to CN Application No. 201110049840.3; 13 pages.
Notification of Reasons for Refusal mailed Mar. 15, 2011, directed to JP Application No. 2005-144304; 6 pages.
Decision of Refusal mailed Jun. 24, 2011, directed to JP Application No. 2005-144304; 4 pages.
Hearing mailed Nov. 29, 2011, directed to JP Application No. 2005-144304; 6 pages.
Notification of Reasons for Refusal mailed Mar. 15, 2011, directed to JP Application No. 2005-144292; 6 pages.
Decision of Refusal mailed Jun. 28, 2011, directed to JP Application No. 2005-144292; 4 pages.
Notification of Reasons for Refusal mailed Mar. 15, 2011, directed to JP Application No. 2005-144318; 6 pages.
Decision of Refusal mailed Jun. 28, 2011, directed to JP Application No. 2005-144318; 4 pages.
Notification of Reasons for Refusal mailed Aug. 17, 2011, directed to JP Application No. 2006-006210; 5 pages.
Notification of Reasons for Refusal mailed Aug. 9, 2011, directed to JP Application No. 2005-249046; 6 pages.
Notification of Reasons for Refusal mailed Nov. 25, 2010, directed to JP Application No. 2006-002346; 4 pages.
Notification of Reasons for Refusal mailed Jul. 12, 2011, directed to JP Application No. 2006-002346; 6 pages.
Notification of Reasons for Refusal mailed Feb. 14, 2012, directed to JP Application No. 2006-002346; 4 pages.
Notification of Reasons for Refusal mailed May 27, 2011, directed to JP Application No. 2006-005787; 6 pages.
Notification of Reasons for Refusal mailed Dec. 22, 2011, directed to JP Application No. 2006-005787; 4 pages.
Hearing dated Apr. 9, 2013, directed to JP Application No. 2006-005787; 8 pages.
Notification of Reasons for Refusal mailed Nov. 25, 2010, directed to JP Application No. 2006-005803; 4 pages.
Notification of Reasons for Refusal mailed Oct. 4, 2011, directed to JP Application No. 2006-235978; 13 pages.
Notification of Reasons for Refusal mailed Feb. 1, 2012, directed to JP Application No. 2007-084785; 8 pages.
International Preliminary Report on Patentability and Written Opinion mailed Jul. 24, 2008, directed to International Application No. PCT/JP2007/050072; 11 pages.
International Search Report mailed Mar. 6, 2007, directed to International Application No. PCT/JP2007/050072; 3 pages.
International Preliminary Report on Patentability mailed Mar. 13, 2008, directed to International Application No. PCT/JP2006/316372; 6 pages.
International Search Report mailed Nov. 21, 2006, directed to Application No. PCT/JP2006/316372; 4 pages.
International Search Report mailed Aug. 8, 2006, directed to International Application No. PCT/JP2006/309380;11 pages.
International Search Report mailed Jun. 24, 2008, directed to International Application No. PCT/JP2008/054583; 2 pages.
International Search Report mailed May 30, 2006, directed to International Application No. PCT/JP2006/303605; 4 pages.
International Search Report mailed Nov. 27, 2007, directed to International Application No. PCT/JP2007/065934; 1 page.
International Search Report mailed Nov. 27, 2007, directed to International Application No. PCT/JP2007/066288; 4 pages.
Notice to Submit a Response mailed Jul. 7, 2011, directed to KR Application No. 10-2009-7013449; 5 pages.
Notice to Submit a Response mailed Jul. 7, 2011, directed to KR Application No. 10-2009-7013450; 6 pages.
Official Letter mailed Nov. 17, 2010, directed to TW Application No. 096100913; 7 pages.
Official Letter mailed May 18, 2011, directed to TW Application No. 096130712; 10 pages.
Official Letter mailed Nov. 24, 2011, directed to TW Application No. 97109615;10 pages.
Matsunaga, K. (2005). "Hard Foam" Section 7.4.3. In *The Comprehensive Materials and Technology for a Novel Polyurethane Production*. First Print, Kabushiki Kaisha CMC Shuppan, pp. 106-109.

POLISHING PAD

REFERENCE TO RELATED APPLICATIONS

This application is a continuation application of U.S. patent application Ser. No. 12/439,154, filed Feb. 26, 2009, which is a national stage application under 35 USC 371 of International Application No. PCT/JP2007/065934, filed Aug. 16, 2007, which claims the priority of Japanese Patent Application Nos. 2006-230805, filed Aug. 28, 2006, 2006-234060, filed Aug. 30, 2006, 2007-184644, filed Jul. 13, 2007, and 2007-184658, filed Jul. 13, 2007, the contents of all of which prior applications are incorporated herein by reference.

FIELD OF THE INVENTION

The invention relates to a polishing pad capable of performing planarization of materials requiring a high surface planarity such as optical materials including a lens and a reflecting mirror, a silicon wafer, a glass substrate or an aluminum substrates for a hard disc and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND OF THE INVENTION

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As polishing characteristics of a polishing pad, it is requested that a polished object is excellent in planarity and within wafer non-uniformity and a polishing rate is large. A planarity and within wafer non-uniformity of a polished object can be improved to some extent with a polishing layer higher in elastic modulus. A polishing rate can be bettered by increasing a holding quantity of a slurry on a foam with cells therein.

Polishing pads including a polyurethane foam are proposed as polishing pads that meet the above properties (see Patent Documents 1 and 2). Such a polyurethane foam is produced by a reaction of an isocyanate-terminated prepolymer with a chain extender (curing agent), in which in view of hydrolysis resistance, elastic properties, wear resistance, or the like, a polyether (a polytetramethylene glycol with a number average molecular weight of 500 to 1,600) or a polycarbonate is preferably used as a high molecular polyol component for the isocyanate prepolymer.

However, when the above polishing layer absorbs moisture or water, the cohesion of its hard segment can be reduced so that its dimensional stability can be easily reduced. The polishing pad also has a problem in which in serious cases, it is warped or heaved so that its polishing properties such as planarization properties and within wafer non-uniformity may gradually change.

Patent Document 3 discloses that in order to improve the retainability slurry, a polymer composition for polishing pads should show a volume swelling rate of 20% or less when it is immersed in water at 23° C. for 72 hours. However, such a polymer composition for polishing pads uses a thermoplastic polymer and thus can hardly form a polishing pad that can maintain a high level of dimensional stability when it absorbs moisture or water.

Patent Document 1: Japanese Patent Application Laid-Open (JP-A) No. 2000-17252
Patent Document 2: Japanese Patent No. 3359629
Patent Document 3: JP-A No. 2001-47355

SUMMARY OF THE INVENTION

An object of a first aspect of the invention is to provide a polishing pad capable of maintaining a high level of dimensional stability during absorption of moisture or water and to provide a method for manufacturing such a polishing pad. An object of a second aspect of the invention is to provide a polishing pad that can maintain a high level of dimensional stability during absorption of moisture or water, while having a high level of water absorbing properties, and to provide a method for manufacturing such a polishing pad. Another object of the invention is to provide a method for manufacturing a semiconductor device with the polishing pad.

As a result of investigations to solve the problems, the inventors have found that the objects can be achieved with the polishing pad described below, and have completed the invention.

Specifically, the first aspect of the invention is related to a polishing pad including a polishing layer including a polyurethane foam having fine cells, wherein the polyurethane foam includes a cured product of a reaction of an isocyanate-terminated prepolymer (A), a polymerized diisocyanate, and a chain extender, and the isocyanate-terminated prepolymer (A) includes an isocyanate monomer, a high molecular weight polyol (a), and a low molecular weight polyol.

In conventional polishing layers, the cohesion of the hard segment can be easily reduced during absorption of moisture or water. It is considered that this is because conventional polishing layers are made of polyurethane foams whose hard segment is formed only by physical crosslinks and that, therefore, such polishing layers can more significantly undergo dimensional change due to elongation, warpage, or the like as they absorb more moisture or water.

The inventors have found that use of an isocyanate-terminated prepolymer (A) including an isocyanate monomer, a high molecular weight polyol (a), and a low molecular weight polyol in combination with a polymerized diisocyanate and partial introduction of chemical crosslinks into a polymer by a reaction of these materials with a chain extender (partially forming a three-dimensional crosslink structure) allow the production of a polishing layer whose hard segment has increased cohesion during absorption of moisture or water and which can maintain a high level of dimensional stability. When the polymerized diisocyanate is not incorporated into the isocyanate-terminated prepolymer (A) but allowed to react directly with the chain extender, chemical crosslinks can be regularly incorporated into the polymer, so that dimensional change can be made uniform over the surface of the polishing layer, which can reduce variations in polishing properties.

The high molecular weight polyol (a) is preferably a polyether polyol with a number average molecular weight of 500 to 5,000. The isocyanate monomer is preferably toluene diisocyanate and dicyclohexylmethane diisocyanate. The polymerized diisocyanate is preferably a polymerized hexamethylene diisocyanate of isocyanurate type and/or biuret type. When these materials are used, the polyurethane foam can be produced with good handling ability so that the invention can be more effective.

The polymerized diisocyanate is preferably added in an amount of 5 to 40 parts by weight, based on 100 parts by weight of the isocyanate-terminated prepolymer (A). If the amount of addition of the polymerized diisocyanate is less than 5 parts by weight, the ratio of chemical crosslinks in the polymer can be insufficient so that the cohesion of the hard segment can be insufficient during absorption of moisture or water and that it may tend to be difficult to maintain the high level dimensional stability of the polishing layer. On the other hand, if the amount is more than 40 parts by weight, the content of chemical crosslinks in the polymer can be so high that the polishing layer can have excessively high hardness and that the within wafer non-uniformity of the polished object may tend to be reduced. In such a case, the surface of the object being polished can also be easily scratched.

The polyurethane foam preferably has an average cell diameter of 20 to 70 μm and preferably shows a dimensional change of 0.8% or less when it absorbs water. If the average cell diameter is outside the range, the polishing rate can be reduced, or the planarity of the polished object may tend to be low. If the dimensional change is more than 0.8% upon absorption of water, the polishing layer may tend to undergo significant dimensional change when it absorbs moisture or water.

The second aspect of the invention is related to a polishing pad including a polishing layer including a polyurethane foam having fine cells, wherein the polyurethane foam includes a cured product of a reaction of: an isocyanate-terminated prepolymer (A) including an isocyanate monomer, a high molecular weight polyol (a), and a low molecular weight polyol; an isocyanate-terminated prepolymer (B) including a polymerized diisocyanate and a high molecular weight polyol (b); and a chain extender.

The inventors have found that use of an isocyanate-terminated prepolymer (A) including an isocyanate monomer, a high molecular weight polyol (a), and a low molecular weight polyol in combination with another isocyanate-terminated prepolymer (B) including a polymerized diisocyanate and another high molecular weight polyol (b) and regular introduction of chemical crosslinks into a polymer by a reaction of these materials with a chain extender (regularly forming a three-dimensional crosslink structure) allow the production of a polishing layer whose hard segment has increased cohesion during absorption of moisture or water and which can maintain a high level of dimensional stability. Further, when the two types of prepolymers are used, the chemical crosslinking network can be extended to obtain a polyurethane foam with a high level of water absorbing properties, so that the retainability a slurry and the polishing rate can be enhanced.

The high molecular weight polyol (a) is preferably a polyether polyol with a number average molecular weight of 500 to 5,000. The isocyanate monomer is preferably toluene diisocyanate and dicyclohexylmethane diisocyanate. The high molecular weight polyol (b) is preferably a polyether polyol with a number average molecular weight of 200 to 1,000. The polymerized diisocyanate is preferably a polymerized hexamethylene diisocyanate of isocyanurate type and/or biuret type. When these materials are used, the polyurethane foam can be produced with good handling ability so that the invention can be more effective.

The isocyanate-terminated prepolymer (B) is preferably added in an amount of 5 to 60 parts by weight, based on 100 parts by weight of the isocyanate-terminated prepolymer (A). If the amount of addition of the isocyanate-terminated prepolymer (B) is less than 5 parts by weight, the content of chemical crosslinks in the polymer can be insufficient so that the cohesion of the hard segment can be insufficient during absorption of moisture or water and that it may tend to be difficult to keep the dimensional stability of the polishing layer at a high level. In addition, it may tend to be difficult to produce a polyurethane foam with a high level of water absorbing properties. On the other hand, if the amount is more than 60 parts by weight, the content of chemical crosslinks in the polymer can be so high that the polishing layer can have excessively high hardness and that the within wafer non-uniformity of the polished object may tend to be reduced. In such a case, the surface of the object being polished can also be easily scratched.

The polyurethane foam preferably has an average cell diameter of 20 to 70 μm and preferably shows a dimensional change of 0.8% or less and a water absorption rate of 4% or more when it absorbs water. If the average cell diameter is outside the range, the polishing rate can be reduced, or the planarity of the polished object may tend to be low. If the dimensional change ratio is more than 0.8% upon absorption of water, the polishing layer may tend to undergo significant dimensional change when it absorbs moisture or water. If the water absorption rate is less than 4%, the retainability a slurry can be insufficient so that it may tend to be difficult to enhance the polishing rate.

In the first and second aspects of the invention, the polyurethane foam preferably has an Asker D hardness of 45 to 65 degrees. If the Asker D hardness is less than 45 degrees, the planarity of the polished object may tend to be reduced. If the Asker D hardness is more than 65 degrees, the within wafer non-uniformity of the polished object may tend to be reduced, although the polished object will have good planarity. In such a case, the surface of the object being polished can also be easily scratched.

In the first and second aspects of the invention, the polyurethane foam preferably contains 0.05 to 10% by weight of a nonionic silicone surfactant. If the content of the nonionic silicone surfactant is less than 0.05% by weight, it may tend to be difficult to produce a microcellular foam. If the content of the nonionic silicone surfactant is more than 10% by weight, it may tend to be difficult to obtain a high-hardness polyurethane foam due to the plasticizing effect of the surfactant.

The first aspect of the invention is also related to a method for manufacturing a polishing pad, including the step (1) of mixing a first component containing an isocyanate-terminated prepolymer with a second component containing a chain extender and curing the mixture to form a polyurethane foam, wherein the step (1) includes adding a nonionic silicone surfactant to the first component containing the isocyanate-terminated prepolymer so that the polyurethane foam will contain 0.05 to 10% by weight of the nonionic silicone surfactant, stirring the first component together with a non-reactive gas to form a cell dispersion liquid in which the non-reactive gas is dispersed in the form of fine cells, then mixing the second component containing the chain extender into the cell dispersion liquid, and curing the mixture to form the polyurethane foam, the isocyanate-terminated prepolymer is an isocyanate-terminated prepolymer (A) including an isocyanate monomer, a high molecular weight polyol (a), and a low molecular weight polyol, and the first component further contains a polymerized diisocyanate.

The second aspect of the invention is also related to a method for manufacturing a polishing pad, including the step (1) of mixing a first component containing isocyanate-terminated prepolymers with a second component containing a chain extender and curing the mixture to form a polyurethane foam, wherein the step (1) includes adding a nonionic silicone surfactant to the first component containing the isocyanate-terminated prepolymers so that the polyurethane foam will contain 0.05 to 10% by weight of the nonionic silicone surfactant, stirring the first component together with a non-reactive gas to form a cell dispersion liquid in which the non-reactive gas is dispersed in the form of fine cells, then mixing the second component containing the chain extender into the cell dispersion liquid, and curing the mixture to form the polyurethane foam, the isocyanate-terminated prepolymers are an isocyanate-terminated prepolymer (A) including an isocyanate monomer, a high molecular weight polyol (a), and a low molecular weight polyol and an isocyanate-terminated prepolymer (B) including a polymerized diisocyanate and a high molecular weight polyol (b).

The invention is also related to a method for manufacturing a semiconductor device, including the step of polishing a surface of a semiconductor wafer using the polishing pad.

DETAILED DESCRIPTION OF THE INVENTION

The polishing pad of the invention includes a polishing layer including a polyurethane foam having fine cells. The polishing pad of the invention may be only the polishing layer or a laminated body of the polishing layer and any other layer (such as a cushion layer).

Polyurethane is a preferred material for forming the polishing layer, because polyurethane is excellent in abrasion resistance and polymers with desired physical properties can be easily obtained by varying the raw material composition.

In the first aspect of the invention, the polyurethane resin includes a cured product of a reaction of: an isocyanate-terminated prepolymer (A) including an isocyanate monomer, a high molecular weight polyol (a), and a low molecular weight polyol; a polymerized diisocyanate; and a chain extender.

In the second aspect of the invention, the polyurethane resin includes a cured product of a reaction of: an isocyanate-terminated prepolymer (A) including an isocyanate monomer, a high molecular weight polyol (a), and a low molecular weight polyol; an isocyanate-terminated prepolymer (B) including a polymerized diisocyanate and a high molecular weight polyol (b); and a chain extender.

As the isocyanate monomer, a compound known in the field of polyurethane can be used without particular limitation. The isocyanate monomer includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof. Among the above isocyanate monomers, toluene diisocyanate and dicyclohexylmethane diisocyanate are preferably used in combination.

As used herein, the term 'polymerized diisocyanate' refers to any of polymerized isocyanate derivatives produced by addition of three or more molecules of diisocyanate, or refers to a mixture of the isocyanate derivatives. For example, the isocyanate derivative may be of (1) trimethylolpropane adduct type, (2) biuret type, (3) isocyanurate type, or the like. In particular, the isocyanurate type or the biuret type is preferred.

In the invention, the polymerized diisocyanate is preferably produced using aliphatic diisocyanate, specifically 1,6-hexamethylene diisocyanate. The polymerized diisocyanate may also be a modification such as a urethane-modified, allophanate-modified, or biuret-modified polymerized diisocyanate.

As the high molecular weight polyol (a) and (b), those usually used in the art of polyurethane can be exemplified. Examples thereof include polyether polyols represented by polytetramethylene ether glycol and polyethylene glycol; polyester polyols represented by polybutylene adipate; polyester polycarbonate polyols exemplified by reaction products of polyester glycol such as polycaprolactone polyol or polycaprolactone and alkylene carbonate; polyester polycarbonate polyols obtained by reacting ethylene carbonate with polyvalent alcohol and the reacting the resultant reaction mixture with an organic dicarboxylic acid; and polycarbonate polyols obtained by ester exchange reaction between polyhydroxyl compound and aryl carbonate. These may be used singly or in combination of two or more kinds.

The number average molecular weight of the high molecular weight polyol (a) is not particularly limited, however, from the viewpoint of modulus characteristic of obtainable polyurethane resin it is preferably in the range of 500 to 5000, more preferably in the range of 1000 to 2000. When the number average molecular weight is less than 500, a polyurethane resin obtained therefrom do not have sufficient modulus characteristic, and is likely to be a brittle polymer. And thus, a polishing pad formed of such polyurethane resin is too hard, and result in occurrence of scratch on surface of an object to be polished. Also it is undesired from the viewpoint of life time of polishing pad because ablation is more likely to occur. On the other hand, number average molecular weight exceeding 5000 is not favorable because a polishing pad formed of a polyurethane resin obtainable therefrom is too soft to obtain sufficiently satisfactory planarity.

The number average molecular weight of the high molecular weight polyol (b) is, although not limited particularly, preferably from 200 to 1,000, more preferably from 250 to 650, in view of the water absorption rate and the dimensional change of the resulting polyurethane resin upon absorption of water. If the number average molecular weight is less than 200, the space between crosslinks may be so short that it may tend to be difficult to retain water. On the other hand, if the number average molecular weight is more than 1,000, the space between crosslinks may be so long that the water absorption may increase and that the dimensional change upon absorption of water may tend to increase.

Examples of the low molecular weight polyol include ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy)benzene, trimethylolpropane, glycerin, 1,2,6-hexanetriol, pentaerythritol, tetramethylolcyclohexane, methylglucoside, sorbitol, mannitol, dulcitol, sucrose, 2,2,6,6-tetrakis(hydroxymethyl)cyclohexanol, diethanolamine, N-methyldiethanolamine, and triethanolamine. One or more of these polyols may be used alone or in any combination. In addition, the low molecular weight polyol may also be used as a raw material for the isocyanate-terminated prepolymer (B) if necessary.

A low molecular weight polyamine such as ethylenediamine, tolylenediamine, diphenylmethanediamine, or diethylenetriamine may also be used as a raw material for the isocyanate-terminated prepolymer (A) and (B) concomitantly. An alcoholamine such as monoethanolamine, 2-(2-aminoethylamino)ethanol, or monopropanolamine may also be used concomitantly. These materials may be used alone or one or more of these may be used concomitantly.

In the first aspect of the invention, the amount of the low molecular weight polyol, the low molecular weight polyamine, or the like is, although not limited particularly, preferably from 20 to 70% by mole, based on the amount of full active hydrogen group-containing compounds used as raw materials for the isocyanate-terminated prepolymer (A), while it may be appropriately determined depending on the desired properties of the polishing pad (polishing layer) to be produced.

In the second aspect of the invention, the amount of the low molecular weight polyol, the low molecular weight polyamine, or the like is, although not limited particularly, preferably from 10 to 25% by mole, based on the amount of all the active hydrogen group-containing compounds used as raw materials for the isocyanate-terminated prepolymer (A), while it may be appropriately determined depending on the desired properties of the polishing pad (polishing layer) to be produced.

When the isocyanate-terminated prepolymer (B) is prepared, the polymerized diisocyanate and the high molecular weight polyol (b) are preferably mixed in such a manner that the NCO index falls within the range of 3 to 5, more preferably within the range of 3 to 4.

In a case where a polyurethane foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more.

In the first aspect of the invention, the mixing ratio of the isocyanate-terminated prepolymer (A), the polymerized diisocyanate, and the chain extender may be varied depending on the molecular weight of each material and the desired physical properties or the like of the polishing pad. The amount of addition of the polymerized diisocyanate is preferably from 5 to 40 parts by weight, more preferably from 10 to 20 parts by weight, based on 100 parts by weight of the isocyanate-terminated prepolymer (A). Further, in order to obtain polishing pad having desired polishing properties, the number of isocyanate groups in the isocyanate components is preferably from 0.80 to 1.20, more preferably from 0.99 to 1.15 per the number of active hydrogen groups (hydroxyl groups and/or amino groups) in the chain extender. If the number of isocyanate groups is outside the range, insufficient curing could occur so that the required specific gravity or hardness could not be achieved, which tends to decrease the polishing properties.

In the second aspect of the invention, the mixing ratio of the isocyanate-terminated prepolymer (A), the isocyanate-terminated prepolymer (B), and the chain extender may be varied depending on the molecular weight of each material and the desired physical properties of the polishing pad. The amount of addition of the isocyanate-terminated prepolymer (B) is preferably from 5 to 60 parts by weight, more preferably from 10 to 40 parts by weight, based on 100 parts by weight of the isocyanate-terminated prepolymer (A). Further, in order to obtain a polishing pad having desired polishing properties, the number of isocyanate groups in the prepolymers is preferably from 0.8 to 1.2, more preferably from 0.99 to 1.15 per the number of active hydrogen groups (hydroxyl groups and/or amino groups) in the chain extender. If the number of isocyanate groups is outside the range, insufficient curing could occur so that the required specific gravity or hardness could not be achieved, which tends to decrease the polishing properties.

The polyurethane foam is preferably produced by melting method in view of cost, working environment and so on, while it may be produced by application of any known urethane foaming techniques such as melting method and solution technique.

According to the invention, the polyurethane foam production is performed using a prepolymer process. Polyurethane resin produced by prepolymer process has a preferably excellent physical properties.

Note that an isocyanate-terminated prepolymer (A) and (B) with a molecular weight of the order in the range of from 800 to 5000 is preferable because of excellency in workability and physical properties.

In the first aspect of the invention, the polyurethane foam is produced by mixing a first component containing the isocyanate-terminated prepolymer (A) and the polymerized diisocyanate with a second component containing the chain extender and curing the mixture.

In the second aspect of the invention, the polyurethane foam is produced by mixing a first component containing the isocyanate-terminated prepolymers (A) and (B) with a second component containing the chain extender and curing the mixture.

The polyurethane foam may be produced by a method in which hollow beads are added, a mechanical foaming method, a chemical foaming method, or the like. While any of the methods may be used in combination, a mechanical foaming method with the aid of a nonionic silicone surfactant made of a copolymer of polyalkylsiloxane and polyether is particularly preferred. Preferred examples of such a nonionic silicone surfactant include SH-192 and L-5340 (manufactured by Dow Corning Toray Silicone Co., Ltd).

Various additives may be mixed; such as a stabilizer including an antioxidant, a lubricant, a pigment, a filler, an antistatic agent and others.

Description will be given of an example of a method of producing a polyurethane foam of a fine cell type constituting a polishing pad (a polishing layer) below. A method of manufacturing such a polyurethane foam has the following steps:

1) Foaming Step of Preparing Cell Dispersion Liquid

In the first aspect of the invention, the step includes adding a nonionic silicone surfactant to the first component containing the isocyanate-terminated prepolymer (A) and the polymerized diisocyanate so that the polyurethane foam will contain 0.05 to 10% by weight of the nonionic silicone surfactant and stirring the mixture in the presence of a non-reactive gas to form a cell dispersion liquid in which the non-reactive gas is dispersed in the form of fine cells.

In the second aspect of the invention, the step includes adding a nonionic silicone surfactant to the first component containing the isocyanate-terminated prepolymers (A) and (B) so that the polyurethane foam will contain 0.05 to 10% by weight of the nonionic silicone surfactant and stirring the mixture in the presence of a non-reactive gas to form a cell dispersion liquid in which the non-reactive gas is dispersed in the form of fine cells. In a case where the prepolymer is solid at an ordinary temperature, the prepolymer is preheated to a proper temperature and used in a molten state.

2) Curing Agent (Chain Extender) Mixing Step

The second component containing a chain extender is added into the cell dispersion liquid, which is agitated to thereby obtain a foaming reaction liquid.

3) Casting Step

The forming reaction liquid is cast into a mold.

4) Curing Step

The foaming reaction liquid having been cast into the mold is heated and reaction-cured.

The non-reactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the nonionic silicone surfactant-containing first component to form fine cells with the non-reactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine cells.

In a preferable mode, different stirrers are used in stirring for forming a cell dispersion liquid in the stirring step and in stirring for mixing an added chain extender in the mixing step, respectively. In particular, stirring in the mixing step may not be stirring for forming cells, and a stirrer not generating large cells is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane foam with fine cells, heating and post-curing of the foam obtained after casting and reacting the forming reaction liquid in a mold until the dispersion lost fluidity are effective in improving the physical properties of the foam, and are extremely preferable. The forming reaction liquid may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the production of the polyurethane foam, a known catalyst promoting polyurethane reaction, such as tertiary amine-based catalysts, may be used. The type and amount of the catalyst added are determined in consideration of flow time in casting in a predetermined mold after the mixing step.

Production of the polyurethane foam may be in a batch system where each component is weighed out, introduced into a vessel and mixed or in a continuous production system where each component and a non-reactive gas are continuously supplied to, and stirred in, a stirring apparatus and the resulting forming reaction liquid is transferred to produce molded articles.

A manufacturing method of a polishing pad may be performed in ways: in one of which a prepolymer which is a raw material from which a polishing pad (a polishing layer) is made is put into a reaction vessel, thereafter a chain extender is mixed into the prepolymer, the mixture is agitated, thereafter the mixture is cast into a mold with a predetermined size to thereby prepare a block and the block is sliced with a slicer like a planer or a band saw; and in another of which in the step of casting into the mold, a thin sheet may be directly produced. Besides, a still another way may be adopted in which a resin of raw material is melted, the melt is extruded through a T die to thereby mold a polyurethane foam directly in the shape of a sheet.

The average cell diameter of the polyurethane foam is preferably from 20 to 70 µm, more preferably from 30 to 60 µm. The polyurethane foam preferably shows a dimensional change of 0.8% or less, more preferably of 0.5% or less, when it absorbs water. The dimensional change may be measured by the method described in the section "Examples." The polyurethane foam also preferably shows a water absorption rate of 4% or more, more preferably of 4.5% or more. In addition, the water absorption rate may be measured by the method described in the section "Examples."

A hardness of a polyurethane foam is preferably in the range of from 45 to 65 degrees, more preferably in the range of from 55 to 65 degrees as measured with an Asker D hardness meter.

A polishing pad (polishing layer) of the invention is provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

No specific limitation is placed on a thickness of a polishing layer, but a thickness thereof is about 0.8 to 4 mm, preferably 1.5 to 2.5 mm. The method of preparing the polishing layer of this thickness includes a method wherein a block of the fine-cell foam is cut in predetermined thickness by a slicer in a bandsaw system or a planing system, a method that involves casting resin into a mold having a cavity of predetermined thickness and curing the resin, a method of using coating techniques and sheet molding techniques, etc.

The scatter of the thickness of the polishing layer is preferably 100 μm or less. When the scatter of the thickness is higher than 100 μm, large undulation is caused to generate portions different in a contacting state with an object of polishing, thus adversely influencing polishing characteristics. To solve the scatter of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the scatter of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

Figure 1:
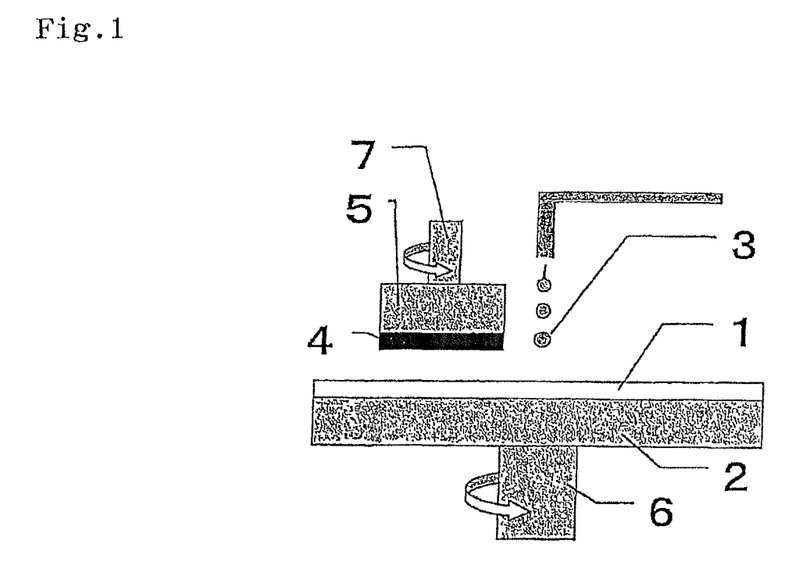
FIG. 1 is a schematic diagram showing a typical polishing apparatus for use in CMP polishing.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]
(Measurement of Number-Average Molecular Weight)

A number-average molecular weight was measured by GPC (a Gel Permeation Chromatography) and a value as measured was converted in terms of standard polystylene molecular weight, and the apparatus and conditions in operation were as follows:

GPC apparatus was an apparatus manufactured by Shimadzu Corp., with Model Number of LC-10A.

Columns that were used in measurement were ones manufactured by Polymer Laboratories Co., in which three columns were in connection including (PL gel, 5 μm and 500 Å), (PL gel, 5 μm and 100 Å) and (PL gel, 5 μm and 50 Å).

A flow rate was 1.0 ml/min.
A concentration was 1.0 g/l.
An injection quantity was 40 μl.
A column temperature was 40° C.
An eluent was tetrahydrofuran.

(Measurement of Average Cell Diameter)

The prepared polyurethane foam was sliced with a microtome cutter into measurement samples each with the thinnest possible thickness of 1 mm or less. A surface of a sample was photographed with a scanning electron microscope (S-3500N, Hitachi Science Systems Co., Ltd.) at a magnification of ×100. An effective circular diameter of each of all cells in an arbitrary area was measured with an image analyzing soft (manufactured by MITANI Corp. with a trade name WIN-ROOF) and an average cell diameter was calculated from the measured values.

(Measurement of Specific Gravity)

Determined according to JIS Z8807-1976. A manufactured polyurethane foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd.).

(Measurement of Hardness)

Measurement is conducted according to JIS K6253-1997. A manufactured polyurethane foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Measurement of Dimensional Change Upon Absorption of Water)

The measurement was performed according to JIS K 7312. The resulting polyurethane foam was cut into a sample 20 mm in width, 50 mm in length, and 1.27 mm in thickness. The sample was immersed in distilled water at 25° C. for 48 hours, and the dimensional change was calculated by substituting its lengths before and after the immersion into the following formula: dimensional change (%)=[(the length after the immersion−the length before the immersion)/(the length before the immersion)]×100.

(Measurement of Water Absorption Rate)

The measurement was performed according to JIS K 7312. The resulting polyurethane foam was cut into a sample 20 mm in width, 50 mm in length, and 1.27 mm in thickness. The sample was immersed in distilled water at 25° C. for 48 hours, and the water absorption rate was calculated by substituting its weights before and after the immersion into the following formula: water absorption rate (%)=[(the weight after the immersion−the weight before the immersion)/(the weight before the immersion)]×100.

(Evaluation of Polishing Characteristics)

The prepared polishing pad was used to evaluate polishing characteristics by using a polishing apparatus SPP600S (manufactured by Okamoto Machine Tool Works, Ltd.). An about 1 μm thermal-oxide film deposited on an 8-inch silicone wafer was polished by 0.5 μm per one plate, and polishing rate was calculated from the time of this polishing. Table 2 shows the polishing rate of the 100th, 300th and 500th wafers. The thickness of the oxide film was measured by using an interference film thickness measuring instrument (manufactured by Otsuka Electronics Co., Ltd). During polishing, silica slurry (SS12 manufactured by Cabot) was added at a flow rate of 150 ml/min. Polishing loading was 350 g/cm$^2$, the number of revolutions of the polishing platen was 35 rpm, and the number of revolutions of the wafer was 30 rpm.

For evaluation of planarizing characteristics, a 0.5 μm thermal-oxide film was deposited on an 8-inch silicone wafer and subjected to predetermined patterning, and then a 1 μm oxide film of p-TEOS was deposited thereon, to prepare a wafer having a pattern with an initial difference in level of 0.5 μm. This wafer was polished under the above-described conditions.

For planarizing characteristics, an abrasion loss was measured. In two patterns, that is, a pattern having lines of 270 μm in width and spaces of 30 μm arranged alternately and a pattern having lines of 30 μm in width and spaces of 270 μm arranged alternately, the abrasion loss of 270 μm spaces was measured when the difference in level of the top of the line in the two patterns became 2000 Å or less. A lower abrasion of spaces is indicative of higher planarity with less abrasion of portions desired to be not shaved. Tables 1 and 2 show the abrasion loss of the 100th, 300th and 500th wafers.

Figure 2:
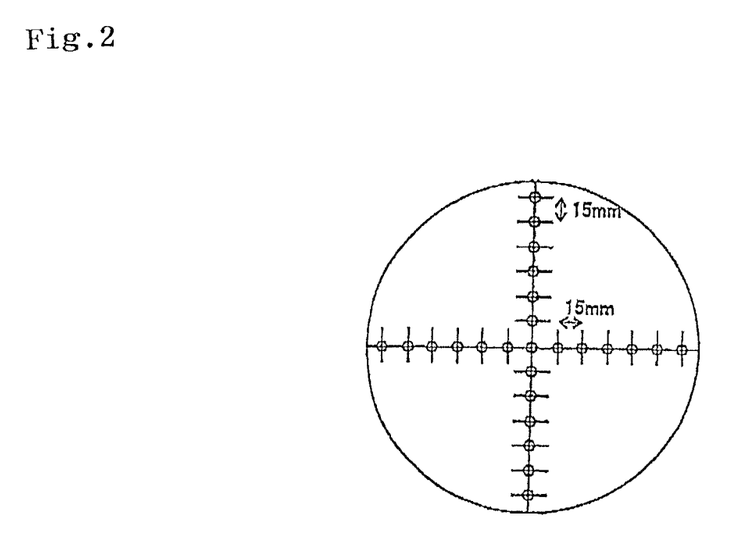
FIG. 2 is a schematic diagram showing 25 points on a wafer at each of which the film thickness is measured.

The within wafer non-uniformity was evaluated as described below. An 8-inch silicon wafer having a 1 μm-thick thermal-oxide film deposited thereon was polished under the conditions described above for 2 minutes. As shown in FIG. 2, the thickness was measured at specific 25 points on the wafer before and after the polishing. The maximum polishing rate and the minimum polishing rate were determined from the thickness of the film measured at specific 25 points on the wafer before and after the polishing, and the within wafer non-uniformity was calculated by substituting the resulting values into the formula below. Tables 1 and 2 show the within wafer non-uniformity of the 100th, 300th and 500th wafers. Note that a reduced value of within wafer non-uniformity means a higher uniformity on a wafer surface.

Within wafer non-uniformity (%)={(the maximum polishing rate−the minimum polishing rate)/(the maximum polishing rate+the minimum polishing rate)}×100

The First Invention

Example 1

To a vessel were added 1,229 parts by weight of toluene diisocyanate (a mixture of toluene 2,4-diisocyanate/toluene 2,6-diisocyanate=80/20), 272 parts by weight of 4,4'-dicyclohexylmethane diisocyanate, 1,901 parts by weight of polytetramethylene ether glycol with a number average molecular weight of 1,018, and 198 parts by weight of diethylene glycol. The mixture was allowed to react at 70° C. for 4 hours to give an isocyanate-terminated prepolymer (A).

To a polymerization vessel were added 100 parts by weight of the prepolymer (A), 20 parts by weight of polymerized 1,6-hexamethylene diisocyanate (Sumijule N-3300 (isocyanurate type) manufactured by Sumika Bayer Urethane Co., Ltd.), and 3 parts by weight of a nonionic silicone surfactant (SH-192 manufactured by Dow Corning Toray Silicone Co., Ltd.), and mixed. The mixture was adjusted to 80° C. and reduced in pressure and degassed. The mixture was then vigorously stirred with a stirring blade at a rotation number of 900 rpm for about 4 minutes in such a manner that bubbles were incorporated into the reaction system. To the mixture was added 39 parts by weight of 4,4'-methylenebis(o-chloroaniline) which had been previously melted at 120° C. The mixture liquid was stirred for about 70 seconds and then poured into a loaf-shaped open mold (casting vessel). When the mixture liquid lost its fluidity, it was placed in an oven and subjected to post curing at 100° C. for 16 hours so that a polyurethane foam block was obtained.

While heated at about 80° C., the polyurethane foam block was sliced using a slicer (VGW-125 manufactured by AMITEC Corporation) so that a polyurethane foam sheet was obtained. The surface of the sheet was then buffed with a buffing machine (manufactured by AMITEC Corporation) until the sheet had a thickness of 1.27 mm. As a result, the sheet had adjusted thickness accuracy. The buffed sheet was formed by punching to have a diameter of 61 cm, and concentric grooves, 0.25 mm in width, 1.50 mm in pitch, and 0.40 mm in depth, were formed in the surface of the sheet using a grooving machine (manufactured by Techno Corporation) so that a polishing sheet (polishing layer) was obtained. A double-faced adhesive tape (Double Tack Tape manufactured by Sekisui Chemical Co., Ltd.) was bonded to the surface of the polishing sheet opposite to the grooved surface using a laminator. The surface of a corona-treated cushion sheet (Toraypef manufactured by Toray Industries, Inc. (0.8 μm-thick polyethylene foam)) was buffed. The buffed cushion sheet was bonded to the double-faced adhesive tape using a laminator. Another double-faced adhesive tape was also bonded to the other side of the cushion sheet using a laminator so that a polishing pad was prepared.

Example 2

A polishing pad was prepared using the process of Example 1, except that 20 parts by weight of polymerized 1,6-hexamethylene diisocyanate (Sumijule N-3200 (biuret type) manufactured by Sumika Bayer Urethane Co., Ltd.) was used instead as the polymerized diisocyanate.

Example 3

A polishing pad was prepared using the process of Example 1, except that the amount of addition of Sumijule N-3300 was changed from 20 parts by weight to 10 parts by weight.

Comparative Example 1

A polishing pad was prepared using the process of Example 1, except that Sumijule N-3300 was not added.

The results in Table 1 show that the polishing pads according to the invention have a high level of dimensional stability during absorption of moisture or water and exhibit reduced variations in planarization properties and within wafer non-uniformity.

The Second Invention

Example 1

To a vessel were added 1,229 parts by weight of toluene diisocyanate (a mixture of toluene 2,4-diisocyanate/toluene 2,6-diisocyanate=80/20), 272 parts by weight of 4,4'-dicyclohexylmethane diisocyanate, 1,901 parts by weight of polytetramethylene ether glycol with a number average molecular weight of 1,018, and 198 parts by weight of diethylene glycol. The mixture was allowed to react at 70° C. for 4 hours to give an isocyanate-terminated prepolymer (A).

To a vessel were added 100 parts by weight of polymerized 1,6-hexamethylene diisocyanate (Sumijule N-3300 (isocyanurate type) manufactured by Sumika Bayer Urethane Co., Ltd.) and 16.3 parts by weight of polytetramethylene ether glycol with a number average molecular weight of 250 (NCO index: 4). The mixture was allowed to react at 100° C. for 3 hours to give an isocyanate-terminated prepolymer (B1).

To a polymerization vessel were added 100 parts by weight of the prepolymer (A), 23.3 parts by weight of the prepolymer (B1), and 3.7 parts by weight of a nonionic silicone surfactant (SH-192 manufactured by Dow Corning Toray Silicone Co., Ltd.), and mixed. The mixture was adjusted to 70° C. and reduced in pressure and degassed. The mixture was then vigorously stirred with a stirring blade at a rotation number of 900 rpm for about 4 minutes in such a manner that bubbles were incorporated into the reaction system. To the mixture was added 36.1 parts by weight of 4,4'-methylenebis(o-chloroaniline) (NCO index: 1.1) which had been previously melted at 120° C. The mixture liquid was stirred for about 70 seconds and then poured into a loaf-shaped open mold (casting vessel). When the mixture liquid lost its fluidity, it was placed in an oven and subjected to post curing at 100° C. for 16 hours so that a polyurethane foam block was obtained.

While heated at about 80° C., the polyurethane foam block was sliced using a slicer (VGW-125 manufactured by AMITEC Corporation) so that a polyurethane foam sheet was obtained. The surface of the sheet was then buffed with a buffing machine (manufactured by AMITEC Corporation) until the sheet had a thickness of 1.27 mm. As a result, the sheet had adjusted thickness accuracy. The buffed sheet was formed by punching to have a diameter of 61 cm, and con-

TABLE 1

| | Average Cell Diameter (μm) | Specific Gravity | D Hardness (degree) | Dimensional Change (%) | Abrasion Loss (Å) | | | Within Wafer Non-Uniformity (%) | | |
|---|---|---|---|---|---|---|---|---|---|---|
| | | | | | 100th | 300th | 500th | 100th | 300th | 500th |
| Example 1 | 52 | 0.86 | 61 | 0.40 | 2700 | 2700 | 2750 | 5.5 | 6.0 | 7.0 |
| Example 2 | 54 | 0.87 | 62 | 0.43 | 2700 | 2750 | 2800 | 5.5 | 6.2 | 7.1 |
| Example 3 | 51 | 0.86 | 55 | 0.45 | 2900 | 2950 | 3000 | 5.5 | 6.5 | 7.5 |
| Comparative Example 1 | 51 | 0.86 | 52 | 0.90 | 3200 | 3350 | 3550 | 7.5 | 10.0 | 20.0 | centric grooves, 0.25 mm in width, 1.50 mm in pitch, and 0.40 mm in depth, were formed in the surface of the sheet using a grooving machine (manufactured by Techno Corporation) so that a polishing sheet (polishing layer) was obtained. A double-faced adhesive tape (Double Tack Tape manufactured by Sekisui Chemical Co., Ltd.) was bonded to the surface of the polishing sheet opposite to the grooved surface using a laminator. The surface of a corona-treated cushion sheet (Toraypef manufactured by Toray Industries, Inc. (0.8 μm-thick polyethylene foam)) was buffed. The buffed cushion sheet was bonded to the double-faced adhesive tape using a laminator. Another double-faced adhesive tape was also bonded to the other side of the cushion sheet using a laminator so that a polishing pad was prepared.

Example 2

To a vessel were added 100 parts by weight of polymerized 1,6-hexamethylene diisocyanate (Sumijule N-3300 (isocyanurate type) manufactured by Sumika Bayer Urethane Co., Ltd.) and 42.4 parts by weight of polytetramethylene ether glycol with a number average molecular weight of 650 (NCO index: 4). The mixture was allowed to react at 100° C. for 3 hours to give an isocyanate-terminated prepolymer (B2).

A polishing pad was prepared using the process of Example 1, except that 28.5 parts by weight of the prepolymer (B2) was used in place of 23.3 parts by weight of the prepolymer (B1), the amount of addition of SH-192 was changed from 3.7 parts by weight to 4.3 parts by weight, and the amount of addition of 4,4'-methylenebis(o-chloroaniline) was changed from 36.1 parts by weight to 36.0 parts by weight.

Example 3

A polishing pad was prepared using the process of Example 1, except that the amount of addition of the prepolymer (B1) was changed from 23.3 parts by weight to 11.7 parts by weight, the amount of addition of SH-192 was changed from 3.7 parts by weight to 3.3 parts by weight, and the amount of addition of 4,4'-methylenebis(o-chloroaniline) was changed from 36.1 parts by weight to 31.3 parts by weight.

Comparative Example 1

A polishing pad was prepared using the process of Example 1, except that the prepolymer (B1) was not added, the amount of addition of SH-192 was changed from 3.7 parts by weight to 3.0 parts by weight, and the amount of addition of 4,4'-methylenebis(o-chloroaniline) was changed from 36.1 parts by weight to 26.6 parts by weight.

The results in Table 2 show that while having a high level of water absorbing properties, the polishing pads according to the invention have a high level of dimensional stability during absorption of moisture or water and a high level of polishing rate, planarization properties and within wafer non-uniformity and exhibit reduced variations in the properties.

The invention claimed is:

1. A polishing pad, comprising a polishing layer comprising a polyurethane foam having fine cells, the polyurethane foam comprising a cured product of a reaction of an isocyanate-terminated prepolymer (A), a polymerized diisocyanate, and a chain extender chain extender, the isocyanate-terminated prepolymer (A) being a reaction product of isocyanate monomers, a high molecular weight polyol (a), and a low molecular weight polyol, wherein the polymerized diisocyanate is added in an amount of 5 to 20 parts by weight, based on 100 parts by weight of the isocyanate-terminated prepolymer (A), and the high molecular weight polyol (a) is a polyether polyol with a number average molecular weight of 500 to 5,000, and the isocyanate monomers are toluene diisocyanate and dicyclohexylmethane diisocyanate, wherein the polymerized diisocyanate is selected from the group consisting of a biuret of hexamethylene diisocyanate, an isocyanurate of hexamethylene diisocyanate, or a combination thereof.

2. The polishing pad according to claim 1, wherein the polyurethane foam has an average cell diameter of 20 to 70 μm and shows a dimensional change of 0.8% or less when it absorbs water.

3. The polishing pad according to claim 1, wherein the polyurethane foam has an Asker D hardness of 45 to 65 degrees.

4. The polishing pad according to claim 1, wherein the polyurethane foam contains 0.05 to 10% by weight of a nonionic silicone surfactant.

* * * * *

TABLE 2

|  | Average Cell Diameter (μm) | Specific Gravity | D-hardness (degree) | Dimensional Change (%) | Water Absorption Rate (%) | Polishing Rate (Å/minute) | | | Abrasion Loss (Å) | | | Within Wafer Non-Uniformity (%) | | |
|---|---|---|---|---|---|---|---|---|---|---|---|---|---|---|
|  |  |  |  |  |  | 100th | 300th | 500th | 100th | 300th | 500th | 100th | 300th | 500th |
| Example 1 | 52 | 0.86 | 59 | 0.41 | 5.5 | 2500 | 2500 | 2500 | 2700 | 2700 | 2750 | 5.5 | 6.0 | 7.0 |
| Example 2 | 54 | 0.87 | 57 | 0.42 | 5.0 | 2350 | 2350 | 2350 | 2800 | 2850 | 2900 | 5.5 | 6.3 | 7.5 |
| Example 3 | 51 | 0.86 | 57 | 0.45 | 4.8 | 2300 | 2300 | 2300 | 2850 | 2900 | 3000 | 5.5 | 6.5 | 7.5 |
| Comparative Example 1 | 51 | 0.86 | 52 | 0.90 | 3.5 | 2000 | 1800 | 1600 | 3200 | 3350 | 3550 | 7.5 | 10.0 | 20.0 |